(12) United States Patent
Wolf et al.

(10) Patent No.: US 11,656,166 B2
(45) Date of Patent: May 23, 2023

(54) METHOD AND APPARATUS FOR DETECTING PARTICLES

(71) Applicants: Robert Bosch GmbH, Stuttgart (DE); Trumpf Photonic Components GmbH, Ulm (DE)

(72) Inventors: Robert Wolf, Dresden (DE); Alexander Van Der Lee, Venlo (NL); Rico Srowik, Radebeul (DE); Hans Spruit, Waalre (NL); Okke Ouweltjes, Sterksel (NL)

(73) Assignees: Robert Bosch GmbH, Stuttgart (DE); Trumpf Photonic Components GmbH, Ulm (DE)

( * ) Notice: Subject to any disclaimer, the term of this patent is extended or adjusted under 35 U.S.C. 154(b) by 636 days.

(21) Appl. No.: 16/689,399

(22) Filed: Nov. 20, 2019

(65) Prior Publication Data

US 2020/0173904 A1 Jun. 4, 2020

(30) Foreign Application Priority Data

Nov. 29, 2018 (DE) .......................... 102018220600.7

(51) Int. Cl.
*G01N 15/10* (2006.01)

(52) U.S. Cl.
CPC ................................ *G01N 15/1012* (2013.01)

(58) Field of Classification Search
CPC ............... G01N 15/1012; G01N 15/06; G01N 15/1434; G01N 2015/0046; G01N 2015/0693; G01N 2015/1454; G01N 2015/1486
USPC ........... 356/335–343, 432–444, 243.2–243.8
See application file for complete search history.

(56) References Cited

U.S. PATENT DOCUMENTS

| | | | |
|---|---|---|---|
| 2014/0273193 A1* | 9/2014 | Li | G01N 15/1031 250/565 |
| 2019/0122748 A1* | 4/2019 | Chun | G16B 20/20 |
| 2019/0285537 A1* | 9/2019 | Spruit | G01N 15/1434 |

FOREIGN PATENT DOCUMENTS

| | | |
|---|---|---|
| DE | 10 2010 031 129 A1 | 1/2012 |
| DE | 10 2011 108 389 A1 | 1/2013 |
| DE | 10 2016 209 052 A1 | 11/2017 |
| WO | 2017198699 A1 | 11/2017 |

* cited by examiner

*Primary Examiner* — Tri T Ton
(74) *Attorney, Agent, or Firm* — Maginot, Moore & Beck LLP

(57) ABSTRACT

The invention relates to a method for detecting particles, having the steps of: receiving (S1) a measurement signal; calculating (S2) at least one estimated noise value using the received measurement signal; and detecting (S3) the particles using the measurement signal on the basis of at least one detection criterion, wherein the at least one detection criterion depends on the at least one calculated estimated noise value.

9 Claims, 5 Drawing Sheets

METHOD AND APPARATUS FOR DETECTING PARTICLES

This application claims priority to German Application No. DE 102018220600.7 filed on Nov. 29, 2018. The entire contents of the above-mentioned German patent application is incorporated herein by reference as part of the disclosure of this U.S. application.

The present invention relates to a method for detecting particles and to an apparatus for detecting particles. In particular, the present invention relates to an apparatus for detecting particles on the basis of a measurement signal from an optical sensor element, wherein the apparatus is integrated in mobile devices and, in particular, in smartphones.

PRIOR ART

Fine dust pollution may be problematic in large cities with a high volume of traffic and in industrial areas, in which case legal requirements have to be taken into account, in particular. Therefore, there is a need to measure the air quality in order to detect when limit values are exceeded, for example, or to identify problematic regions and to initiate countermeasures. Public or scientific facilities usually resort to technically complicated and permanently installed measuring devices in order to determine the particle contamination. However, there is also increasingly interest in the private sector in determining the air quality in situ. Therefore, there is also a particular need for portable and compact devices which nevertheless generate measured values which are as exact as possible.

One possible way of determining the particle contamination is to use optical measuring methods. An optical particle sensor is known from WO 2017/198699 A1. A laser sensor module comprises a multiplicity of lasers which each emit a laser beam. Particle properties of the particles in the environment of the particle sensor are determined with the aid of a self-mixing interference method (SMI method). An SMI method should be understood as meaning the fact that the reflected laser beams interfere with the emitted laser beams, in which case the interference results in changes in the optical and electrical properties of the laser, which can in turn allow conclusions to be drawn with regard to the properties of the particles.

However, portable devices have the added complication that the environmental and operating conditions of the sensor are often not well known or change in the event of a change of location. In particular, the control signal of the lasers may vary or thermal effects may cause fluctuations. As a result, those components of the measurement signal which do not carry any information relating to the particles to be measured are influenced, in particular. A DC component can thus be superimposed on the measurement signal, that is to say a mean contribution which is, however, caused by the measuring method and does not come from the particles themselves. Another component of the measurement signal which does not carry any information is a contribution of a random signal, in particular on account of background noise.

There is therefore a need to ensure accurate detection of particles even under varying measurement conditions.

DISCLOSURE OF THE INVENTION

The invention provides a method for detecting particles and an apparatus for detecting particles.

The respective subclaims relate to preferred embodiments.

According to a first aspect, the invention therefore relates to a method for detecting particles, wherein a measurement signal is received and at least one estimated noise value is calculated using the received measurement signal. The particles are detected using the measurement signal on the basis of at least one detection criterion. The at least one detection criterion depends on the at least one calculated estimated noise value.

According to a second aspect, the invention therefore relates to an apparatus for detecting particles, which apparatus has an interface, a computing device and a detector device. The interface is designed to receive a measurement signal. The computing device is designed to calculate at least one estimated noise value using the received measurement signal. The detection device is designed to detect the particles using the measurement signal on the basis of at least one detection criterion. The at least one detection criterion depends on the at least one calculated estimated noise value.

ADVANTAGES OF THE INVENTION

By virtue of the fact that the detection criterion is adapted on the basis of the calculated estimated noise value, it is possible to reliably detect particles even under variable environmental conditions. In particular, the detection criterion is preferably adapted in such a manner that threshold values for detecting particles are increased in the case of a high level of noise. This makes it possible to avoid incorrect detections if particles which do not exist are detected on account of the high level of noise. In addition to such false-positive detections, it is also possible to avoid false-negative detections by reducing the threshold values for detecting particles in the case of a low level of noise, thus ensuring that as far as possible all particles are also detected as such and the necessary measuring time is minimized. As a result, the invention is particularly suitable for sensors in portable devices which are exposed to variable environmental conditions.

According to one preferred development of the method, the received measurement signal is filtered when calculating the estimated noise value. The filter may be, for example, a so-called matched filter. The filtered measurement signal can then be analyzed further.

According to one preferred development of the method, the calculated at least one estimated noise value comprises at least one of the following variables, namely a mean noise energy of the filtered measurement signal, a mean noise power of the filtered measurement signal, a root mean square value of a noise voltage of the filtered measurement signal, an energy density of the noise of the filtered measurement signal, values of a probability density of the filtered measurement signal, a power spectral density of the filtered measurement signal and a spectral energy density of the filtered measurement signal.

According to one preferred development of the method, the measurement signal is filtered when detecting the particles. The at least one detection criterion is applied to the filtered measurement signal.

According to one preferred development of the method, the filtering of the measurement signal, which is carried out when calculating the estimated noise value and/or when detecting the particles, comprises filtering out a mean contribution to the measurement signal.

According to one preferred development of the method, the measurement signal is filtered when calculating the estimated noise value independently of the filtering of the measurement signal when detecting the particles. In other words, the measurement signal is filtered twice, in which case at least partially different filters can also be used. However, according to another embodiment, the measurement signal can also be filtered only once, in which case the measurement signal filtered in this manner is used both to calculate the estimated noise value and to detect the particles.

According to one preferred development of the method, the at least one detection criterion is satisfied if a signal strength of an evaluation signal dependent on the measurement signal exceeds a threshold value, wherein the threshold value depends on the at least one calculated estimated noise value. In the case of a plurality of detection criteria, the threshold value for each detection criterion can be selected to be at least partially different.

According to one preferred development of the method, the threshold value for at least one first estimated noise value is less than the threshold value for at least one second estimated noise value. In this case, the first estimated noise value is less than the second estimated noise value. This includes, in particular, the special case in which the threshold value is selected to be larger, the larger the estimated noise value. In particular, the threshold value may have a linear or polynomial dependence on the estimated noise value. However, the functional dependence of the threshold value on the estimated noise value also be stepped, for example.

According to one preferred development of the method, at least one estimated noise value is calculated for a multiplicity of frequency ranges using the received measurement signal. A detection value is calculated for the purpose of detecting the particles for each frequency range of the multiplicity of frequency ranges on the basis of one detection criterion of the at least one detection criterion. As a result, it is possible to take into account the frequency dependence of the noise.

According to one preferred development of the method, different calculation rules for calculating the estimated noise values are respectively used for at least two different frequency ranges. In particular, the different statistical dependences of particular frequency ranges are taken into account. In particular, the DC component, which corresponds to a frequency range comprising the frequency of zero, and a mean frequency range comprising the Nyquist frequency, which corresponds to half the sampling frequency, have different statistical properties than the other frequency ranges. These statistical properties can be taken into account by means of different calculation rules. In particular, the estimated noise value can be calculated on the basis of different statistical distributions.

According to one preferred development of the method, different detection criteria for calculating the respective detection value are respectively used for different frequency ranges. The threshold values for the frequency range comprising the frequency of zero and for the frequency range comprising the Nyquist frequency can in turn be adapted differently in comparison with the threshold values for the other frequency ranges.

According to one preferred development of the method, a particle counting rate is determined on the basis of the detected particles. This can be understood as meaning the total number of detected particles in a given interval of time. The particle counting rate may also be based on a particular solid angle range. At least one particle property of the particles or a variable derived therefrom is determined on the basis of the particle counting rate and taking into account the at least one estimated noise value. For example, particle densities, flow rates of the particles, residence times of the particles or values for the air quality can be calculated.

According to one preferred development of the method, a particle counting rate is determined on the basis of the detected particles. At least one estimate of the accuracy of the particle counting rate is calculated on the basis of the at least one estimated noise value. For instance, the accuracy of the particle counting rate can be estimated to be higher, the smaller the at least one estimated noise value. Conversely, the accuracy of the particle counting rate is lower, the higher the at least one estimated noise value.

BRIEF DESCRIPTION OF THE DRAWINGS

In all figures, identical or functionally identical elements and apparatuses are provided with the same reference signs.

DESCRIPTION OF THE EXEMPLARY EMBODIMENTS

Figure 1:
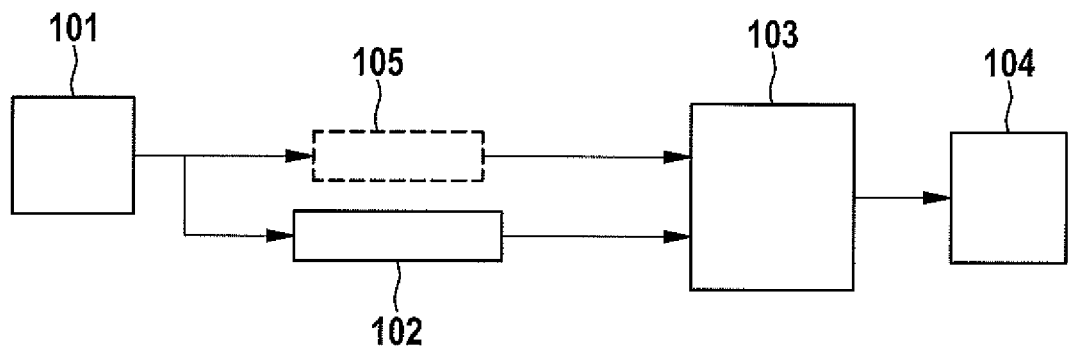
FIG. 1 shows a schematic block diagram of an apparatus for detecting particles according to a first embodiment of the invention.

FIG. 1 shows a schematic block diagram of an apparatus 100 for detecting particles.

The apparatus 100 has an interface 101 which is designed to receive a measurement signal. The measurement signal may be an analog or digital signal from any desired sensor, for instance an optical sensor element which emits and receives laser radiation. The measurement signal may be generated, in particular, by means of self-mixing interference methods. The apparatus 100 may be integrated, together with the sensor element, in a sensor system of a portable apparatus.

The apparatus 100 also has a computing device 102 which evaluates the measurement signal received via the interface 101 and calculates one or more estimated noise values. One of the estimated noise values may be, for example, the mean noise energy of the measurement signal, that is to say that portion of the mean energy of the measurement signal which is assigned to the noise. For this purpose, the entire mean energy of the measurement signal can be calculated first of all and the energy of the DC component can then be subtracted. The estimated noise value may also be a mean noise power of the measurement signal, a root mean square value of a noise voltage of the measurement signal, an energy density of the noise of the measurement signal, values of a probability density of the measurement signal and/or a power spectral density of the measurement signal. Further methods for calculating the at least one estimated noise value can comprise histogram methods, analyses of distribution functions or autocorrelation methods.

The apparatus 100 also comprises a detection device 103 which receives the measurement signal received via the interface 101 and the at least one estimated noise value calculated by the computing device 102 as input variables. The detection device 103 evaluates the received measurement signal in order to detect particles. The detection device 103 can thus compare an amplitude of the received measurement signal with a threshold value, for example, and can detect a particle if the amplitude of the received measurement signal exceeds the threshold value. The detection device 103 outputs a detection signal on the basis of the detection. The threshold value used for detection depends on the at least one estimated noise value. The threshold value is generally intended to assume higher values for higher estimated noise values, that is to say can have a polynomial dependence on the at least one estimated noise value, for example. However, the threshold value can also have a stepped profile as a function of some or all estimated noise values. The threshold value is therefore a rising function with respect to the at least one estimated noise value. In the simplest case, the computing device 102 generates precisely one estimated noise value and the threshold value used by the detection device 103 depends linearly on the estimated noise value, in which case the proportionality factor can be set on the basis of test measurements under controlled conditions.

The apparatus 100 also comprises an evaluation device 104 which is designed to further evaluate the detection signal output by the detection device 103. In particular, the detection device 103 can output a corresponding detection signal to the evaluation device 104 each time the amplitude of the measurement signal exceeds the threshold value, that is to say when a particle is detected. The evaluation device 104 can calculate the total number of particles, for example, or the particle counting rate, that is to say the number of particles in a predefined interval of time. The evaluation device 104 can also calculate variables derived therefrom, for instance a value for the air quality, in which case additional assumptions relating to the type and nature of the particles can be included. In particular, assumptions relating to the density or size of the particles can be included in the calculations.

Instead of the original measurement signal, the detection device 103 can also evaluate a measurement signal which has already been processed and can compare the amplitude of the measurement signal which has already been processed with the threshold value. In particular, the apparatus 100 may optionally have a filter device 105 which filters the measurement signal received via the interface 101. For example, noise components or DC components which are based on the measurement principle but do not come from the particles can be at least partially filtered by means of the filter device 105. The detection device 103 can also compare a signal, which is proportional to the effective voltage of the measurement signal or of the filtered measurement signal, with the threshold value in order to detect the particles.

Figure 2:
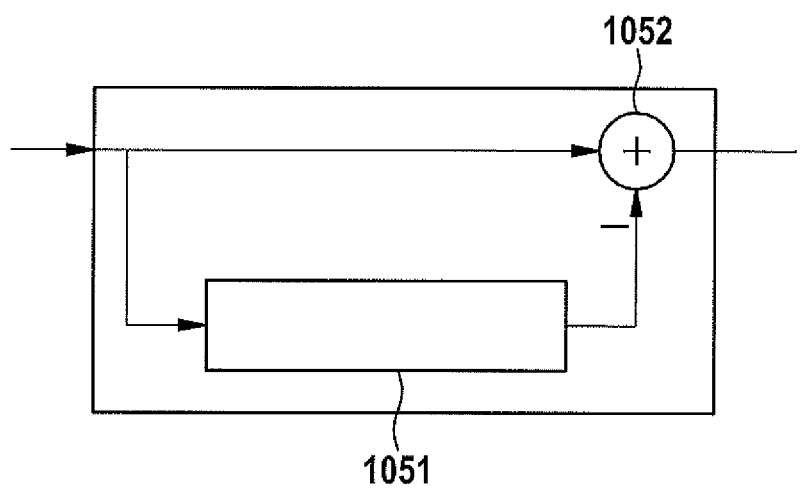
FIG. 2 shows a schematic illustration of a filter device for use in an apparatus for detecting particles.

FIG. 2 shows an exemplary filter device 105, wherein the measurement signal received via the interface 101 is made available to an estimation device 1051 which is designed to estimate the DC component. A subtracting element 1052 is designed to subtract the determined DC component from the received measurement signal and to output the remaining signal as a filtered measurement signal.

Figure 3:
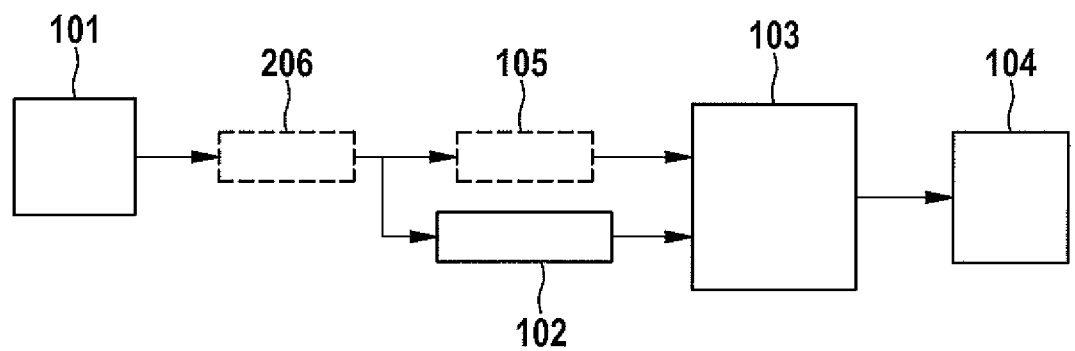
FIG. 3 shows a schematic block diagram of an apparatus for detecting particles according to a second embodiment of the invention.

FIG. 3 shows a schematic block diagram of an apparatus 200 for detecting particles. The apparatus 200 differs from the apparatus 100 shown in FIG. 1 in that, in addition or as an alternative to the first filter device 105 described above, a second filter device 206 is provided and filters the received measurement signal. The computing device 102 receives the measurement signal which has already been filtered by the second filter device 206 as an input variable, in which case the DC component has therefore already been filtered, for example. According to another embodiment, only the second filter device 206 can be provided, while the first filter device 105 is dispensed with. The measurement signal provided via the interface 101 is therefore filtered at the beginning and is then evaluated both by the computing device 102 and by the detection device 103.

Figure 4:
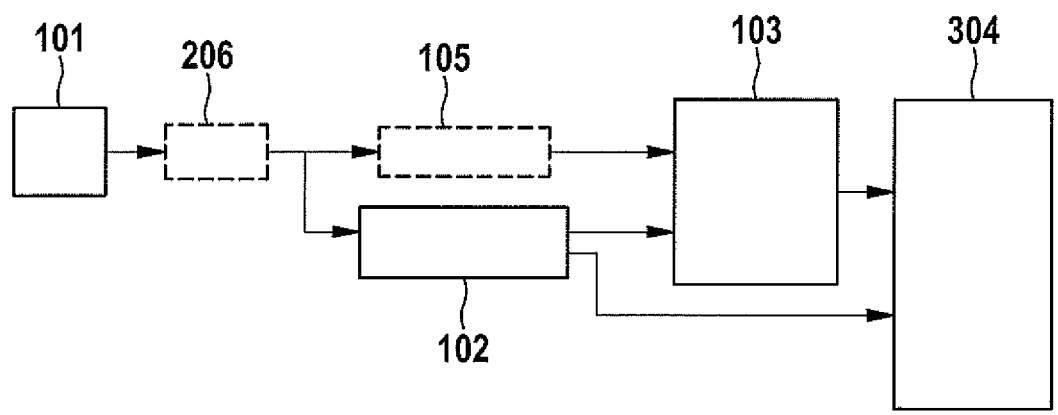
FIG. 4 shows a schematic block diagram of an apparatus for detecting particles according to a third embodiment of the invention.

FIG. 4 shows a schematic block diagram of an apparatus 300 for detecting particles.

The apparatus 300 is a modification of the apparatus 200 shown in FIG. 3. The apparatus 300 differs by virtue of the fact that, in addition to the measurement signal output by the detection device 103, the evaluation device 304 also takes into account at least one estimated noise value which was calculated by the computing device 102. In particular, the environmental conditions can be inferred on the basis of the at least one estimated noise value, which can be included, for instance, in the calculation of the derived variables such as the air quality. Alternatively or additionally, the evaluation device 304 can calculate the accuracy or statistical relevance of the calculated variables, in particular the accuracy or statistical relevance of the particle counting rate. The greater the at least one estimated noise value, the lower the accuracy of the particle counting rate. The accuracy is therefore a falling function with respect to the at least one estimated noise value. The evaluation device 304 can also be designed to control or measure the energy of the measurement signal or the operating point of the sensor. The at least one estimated noise value which is taken into account by the detection device 103 need not be the same as the at least one estimated noise value which is taken into account by the evaluation device 304.

Figure 5:
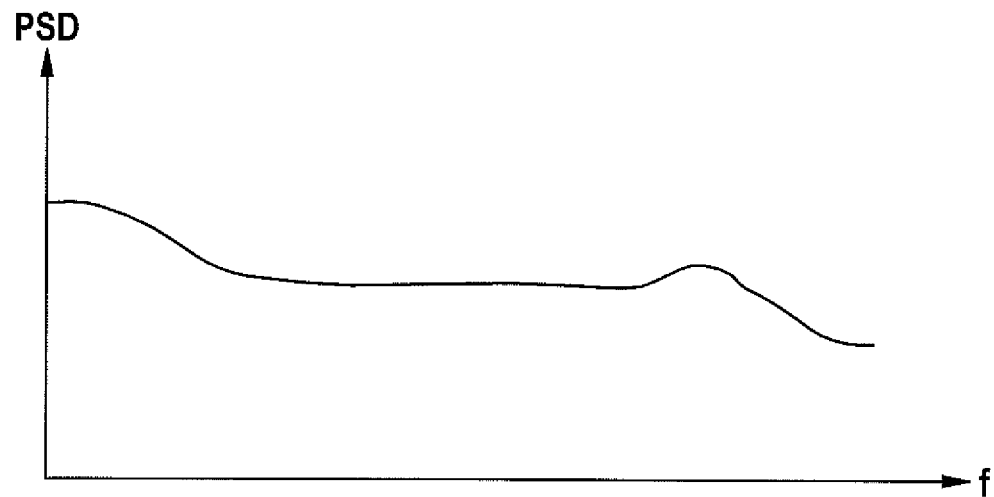
FIG. 5 shows an exemplary frequency dependence of the power spectral density.

FIG. 5 shows the dependence of the power spectral density (PSD) as a function of the frequency f. The noise energy density denotes that contribution to the total power of the noise contribution of the measurement signal which is assigned to a frequency interval df. As can be gathered from FIG. 5, the noise power density is generally not constant, but rather varies as a function of the frequency f.

Figure 6:
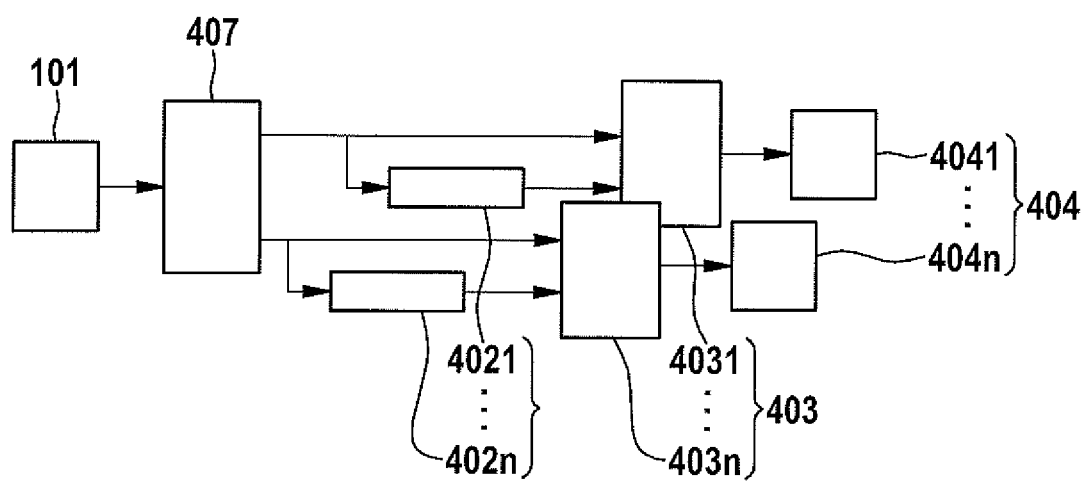
FIG. 6 shows a schematic block diagram of an apparatus for detecting particles according to a fourth embodiment of the invention.

FIG. 6 shows an apparatus 400 for detecting particles. The apparatus 400 has an interface 101 described above and a frequency filter device 407 which calculates the individual frequency contributions of the measurement signal received via the interface 101. The frequency filter device 407 can therefore use a fast Fourier transform, FFT, to determine that portion of the measurement signal which is allotted to a respective bin of a multiplicity N of bins. Each bin corresponds to a particular frequency interval. The bin into which the frequency of zero falls can be referred to as the DC bin, while the remaining bits can be referred to as AC bins. The DC bin therefore corresponds substantially to the mean value of the measurement signal. The apparatus 400 also comprises a multiplicity n of filter device elements 4021 to 402n which form a filter device 402. In this case, n denotes the number of evaluated bins, in which case n is less than or equal to the multiplicity N of bins. The filter device elements 4021 to 402n each calculate at least one estimated noise value for that portion of the measurement signal which is allotted to the corresponding bin, as described in more detail above. The apparatus 400 also comprises a detection device 403 comprising a multiplicity n of detection device elements 4031 to 403n which detect particles on the basis of that portion of the measurement signal which is allotted to the corresponding bin and the associated at least one estimated noise value and output a respective detection signal. An evaluation device 404 has a multiplicity n of evaluation device elements 4041 to 404n which evaluate the respective detection signal further, as described above, and calculate a particle counting rate for the corresponding bin, for example. It is therefore possible to carry out the detection separately for each bin, that is to say for each frequency range. Provision may also be made for the evaluation device 404 to evaluate all detection signals in a parallel manner, for instance in order to calculate the total counting rate.

The calculation rules for calculating the estimated noise values can differ for different frequency ranges. Furthermore, the detection criteria which are used to calculate the respective detection value can differ for different frequency ranges. In particular, the threshold value can depend on the bin.

Figure 7:
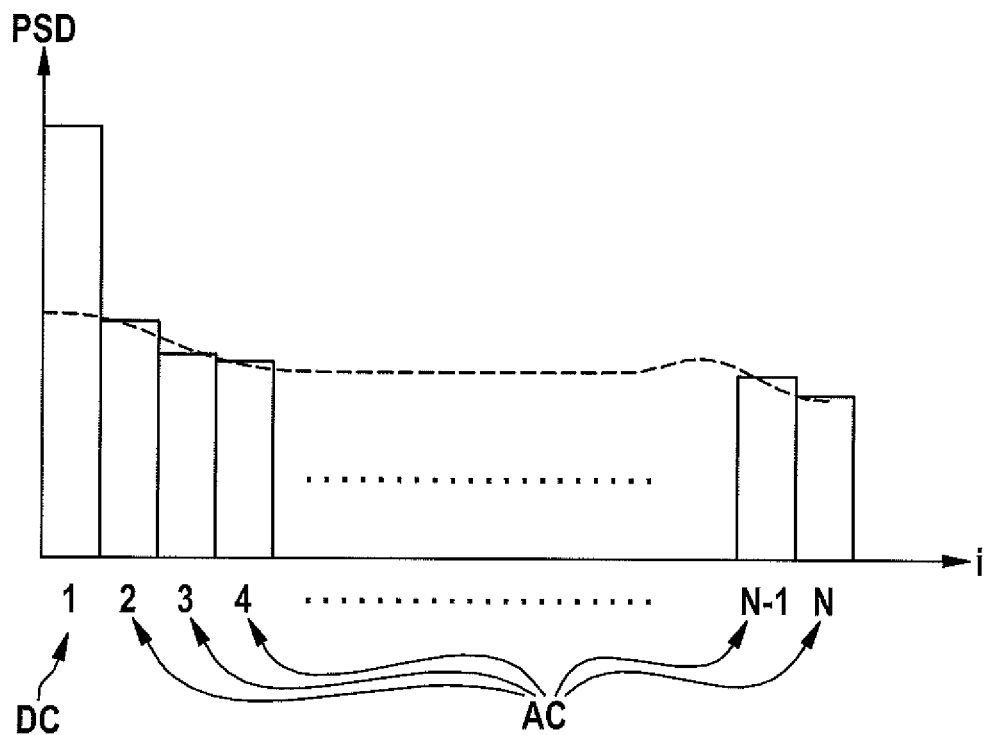
FIG. 7 shows an exemplary distribution of the power density to different frequency bins.

FIG. 7 shows the dependence of the noise power density PSD or of the power spectrum (PS) on the frequency for the individual bins. That portion of the measurement signal which is allotted to a corresponding bin generally comprises the energy contribution on account of the particles and the noise contribution. The measurement signal therefore has a random stochastic behavior. The statistical properties of the random processes differ for different frequency ranges. In particular, the DC bin and that AC bin in which the Nyquist frequency lies have a statistical behavior differing from the remaining AC bins. The estimated noise values are calculated for these bins using different statistical assumptions, for example. In particular, a chi square distribution with k=1 can be assumed for the DC bin and the AC bin in which the Nyquist frequency lies, whereas a chi square distribution with k=2 is assumed for the remaining AC bins. In particular, the threshold value for the DC bin and the AC bin in which the Nyquist frequency lies can be calculated and adapted differently in comparison with the threshold value for the remaining AC bins. For example, the threshold values can be selected in such a manner that the ratio of the energy of the measurement signal on account of the particles to the energy of the measurement signal on account of the noise assumes substantially the same value for all bins.

Figure 8:
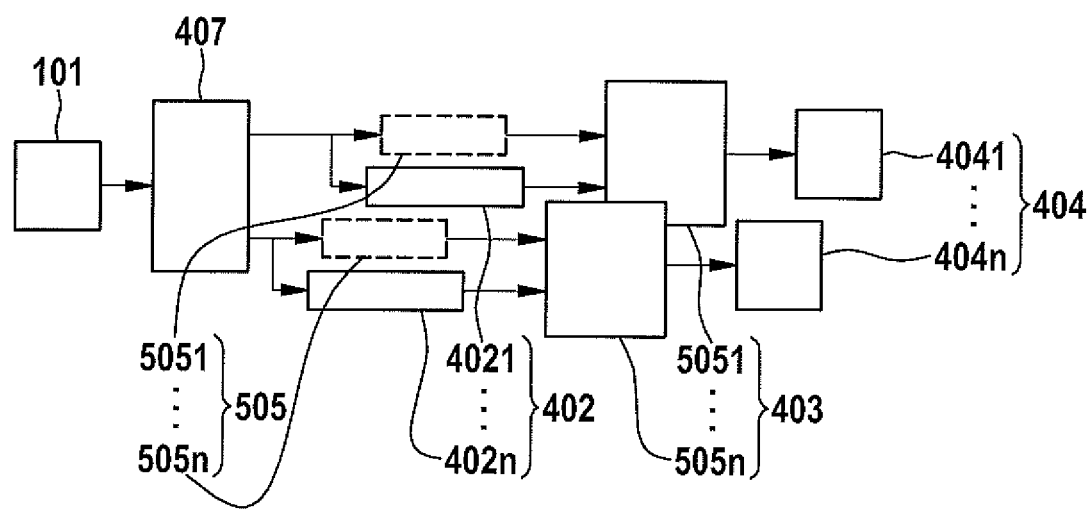
FIG. 8 shows a schematic block diagram of an apparatus for detecting particles according to a fifth embodiment of the invention.

FIG. 8 shows an apparatus 500 for detecting particles, which is a modification of the apparatus 400. A filter device 505 is additionally provided and comprises a multiplicity n of filter device elements 5051 to 505n which filter that portion of the measurement signal which is allotted to a corresponding bin in the manner described above before this portion is evaluated by the respective detection device element 4031 to 403n in order to detect the particles.

Figure 9:
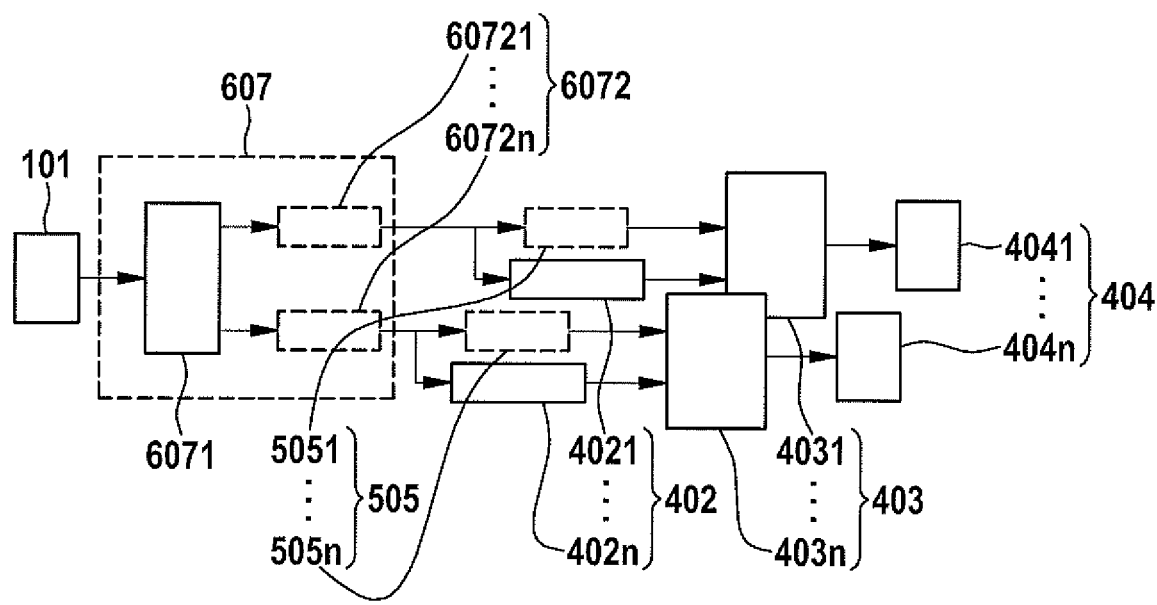
FIG. 9 shows a schematic block diagram of an apparatus for detecting particles according to a sixth embodiment of the invention.

FIG. 9 shows an apparatus 600 for detecting particles, which is a modification of the apparatus 500. In addition to a filter element 6071 which performs the fast Fourier transform, the frequency filter device 607 has a multiplicity n of second filter device elements 60721 to 6072n which form a second filter device 6072 and filter the measurement signal even before the respective at least one estimated noise value is calculated. The second filter device 6072 can be provided in addition or as an alternative to the first filter device 505.

Figure 10:
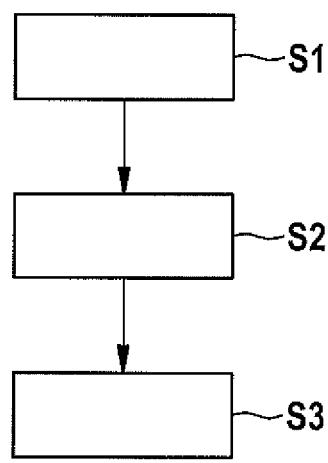
FIG. 10 shows a schematic flowchart of a method for detecting particles according to one embodiment of the invention.

FIG. 10 shows a flowchart of a method for detecting particles.

In a method step S1, a measurement signal is received, in particular a measurement signal from an optical sensor.

In a method step S2, at least one estimated noise value is calculated using the received measurement signal. As described above, at least one estimated noise value can also be respectively calculated for a multiplicity n of bins, that is to say for respective frequency ranges. Provision may also be made for the measurement signal to be filtered before calculating the at least one estimated noise value. Different calculation rules for calculating the estimated noise values can be used for the different frequency ranges.

In a method step S3, particles are detected using the measurement signal on the basis of at least one detection criterion. The detection criterion, in which case the comparison with a threshold value can be involved, depends on the at least one estimated noise value. The detection can in turn be carried out separately for each bin, in which case the detection criteria, for instance the threshold values used, can depend on the respective bin. The detection results can then be combined, for instance in order to calculate a total particle counting rate. A measurement signal which has been previously filtered can also be evaluated during detection. Finally, the at least one estimated noise value can also be used to evaluate the measurement signal, in particular to calculate a quality or accuracy of the evaluation.

The invention claimed is:

1. A method for detecting particles, comprising the steps of:
   receiving a measurement signal;
   calculating at least one estimated noise value using the received measurement signal; and
   detecting the particles using the measurement signal on the basis of at least one detection criterion, wherein the at least one detection criterion depends on the at least one calculated estimated noise value,
   wherein at least one estimated noise value is respectively calculated for a multiplicity of frequency ranges using the received measurement signal, and wherein a detection value is calculated for the purpose of detecting the particles for each frequency range of the multiplicity of frequency ranges on the basis of one detection criterion of the at least one detection criterion.

2. The method according to claim 1, wherein the received measurement signal is filtered when calculating the estimated noise value, and wherein the at least one estimated noise value quantifies a noise behavior of the filtered measurement signal.

3. The method according to claim 1, wherein the measurement signal is filtered when detecting the particles and the at least one detection criterion is applied to the filtered measurement signal.

4. The method according to claim 1, wherein the at least one detection criterion is satisfied if a signal strength of an evaluation signal dependent on the measurement signal exceeds a threshold value, wherein the threshold value depends on the at least one calculated estimated noise value.

5. The method according to claim 4, wherein the threshold value for at least one first estimated noise value is less than the threshold value for at least one second estimated noise value, wherein the first estimated noise value is less than the second estimated noise value.

6. The method according to claim 1, wherein different calculation rules for calculating the estimated noise values are respectively used for at least two different frequency ranges.

7. The method according to claim 1, wherein different detection criteria for calculating the respective detection value are respectively used for at least two different frequency ranges.

8. The method according to claim 1, wherein a particle counting rate is determined on the basis of the detected particles, and wherein at least one particle property of the particles is determined on the basis of the particle counting rate and taking into account the at least one estimated noise value.

9. The method according to claim 1, wherein a particle counting rate is determined on the basis of the detected particles, and wherein at least one estimate of the accuracy of the particle counting rate is calculated on the basis of the at least one estimated noise value.

\* \* \* \* \*